US005350100A

United States Patent [19]

Rumpel

[11] Patent Number: 5,350,100

[45] Date of Patent: Sep. 27, 1994

[54] PAPER FEED DEVICE FOR THE TRANSFER STATION OF A PRINTING DEVICE WITH LATENT CHARACTER IMAGE GENERATION

[75] Inventor: Peter Rumpel, Feldkirchen, Fed. Rep. of Germany

[73] Assignee: Siemens Nixdorf Informationssysteme AG, Paderborn, Fed. Rep. of Germany

[21] Appl. No.: 768,186

[22] PCT Filed: Jan. 26, 1990

[86] PCT No.: PCT/EP90/00149

§ 371 Date: Jul. 27, 1992

§ 102(e) Date: Jul. 27, 1992

[87] PCT Pub. No.: WO90/11895

PCT Pub. Date: Oct. 18, 1990

[30] Foreign Application Priority Data

Apr. 5, 1989 [DE] Fed. Rep. of Germany ..... 89105998

[51] Int. Cl.[5] .......................... G03B 1/30; B41J 11/32

[52] U.S. Cl. .......................................... 226/74; 226/75; 400/618

[58] Field of Search .................... 226/74, 75, 170, 199; 400/618

[56] References Cited

U.S. PATENT DOCUMENTS 4,167,346 9/1979 Holland-Letz ...................... 400/618
4,173,420 11/1979 Okabe .............................. 400/618
4,213,551 6/1980 Windele ............................ 226/74
4,345,708 8/1982 Hubbard ............................ 226/74
4,429,984 2/1984 Kiba et al. ........................ 355/3 SH
4,440,516 4/1984 Rosenthal et al. ............. 400/618 X
4,475,677 10/1984 Rutishauser ......................... 226/74
4,593,407 6/1986 Kohishi et al. ...................... 382/46
4,605,145 8/1986 Engelhardt et al. ................. 226/74
5,123,583 6/1992 Kato et al. ........................... 226/74
5,201,595 4/1993 Oda .................................... 400/618

FOREIGN PATENT DOCUMENTS 0189798 8/1986 European Pat. Off. .
2717315 11/1978 Fed. Rep. of Germany .

*Primary Examiner*—Daniel P. Stodola
*Assistant Examiner*—William Stryjewski
*Attorney, Agent, or Firm*—Hill, Steadman & Simpson

[57] ABSTRACT

A paper feed device for feeding continuous stationery (12), provided with lateral perforations, into the transport elements (44) of a transfer station (17) of a non-mechanical printing device, in which paper feed device the transfer station (17) has in the transport direction of the continuous stationery paper transport belts (44) which are motor-driven both on the input and on the output side and engage in the lateral perforation of the continuous stationery (12), and a paper brake (31), which can be actuated when required, is arranged upstream of the input-side transport elements (47) in the transport direction. A switch device (D, C) is provided to feed the continuous stationery accurately after the continuous stationery (12) has been deposited in the output-side paper transport elements (48), which switch device drives the output-side paper transport elements (48) at least for a predeterminable feed time when the paper brake (31) is activated.

9 Claims, 9 Drawing Sheets

PAPER FEED DEVICE FOR THE TRANSFER STATION OF A PRINTING DEVICE WITH LATENT CHARACTER IMAGE GENERATION

BACKGROUND OF THE INVENTION

1. Field of the Invention

The invention relates to a paper feed device for feeding continuous stationery, provided with lateral perforations, into the transport elements of a transfer station of a printing device with latent character image generation;

2. Description of the Related Art

Printing devices with latent character image generation such as are represented, for example, by laser printers, printing devices operating with LED pins or magnetic printers, are generally known and have been used successfully.

In non-mechanical printers, a latent character image is generated, generally with the aid of a laser or with the aid of magnetic recording means, on a photo carrier drum or a magneto-sensitive drum, which latent character image is developed in a developing station by the application of toner and is then transferred in the subsequent transfer station onto a web-shaped recording medium in the form of continuous stationery, or paper, provided with lateral perforations. The image consisting of toner and held loosely on the continuous stationery is fixed with the aid of a fixing device and is then placed by an automatic paper stacker on a paper delivery surface.

Rapid printing devices with latent character image generation of this type are operated together with EDP (Electronic Data Processing) systems and are operated and serviced by the same operating personnel. For this reason, the printing devices must be designed in such a way that a virtually uninterrupted printing operation is guaranteed. For this reason, when a stack of paper has been used up, a new stack of paper must be able to be deposited very rapidly without substantial interruption time. For this reason, printing devices of this type must be of ergonomically optimum design; this preferably applies to the depositing and removal of the paper and to the servicing of the entire plant.

Due to the complicated construction of printing devices of this type and the complicated paper transport path resulting therefrom, in the known non-mechanical printing devices the depositing and removal of the paper are difficult and awkward when the printer starts up and during print interruptions. For this purpose, the transfer station is customarily swiveled away from the intermediate support, e.g. a photo carrier drum, and the paper is deposited in the printing device by hand.

In this case, the paper guidance in the region of the transfer station is particularly problematic, especially in the region of the transfer point. It must thus be ensured that the paper is guided tautly during the printing operation and without clearance around the transfer station. Flapping of the paper in the region of the transfer point leads to disturbances in the transfer operation and consequently to a deterioration of the lettering image, e.g. in the form of smeared print or the like.

Furthermore, the paper transport device must be designed at the transfer station in such a way that a synchronous run of the paper with the photo carrier drum is guaranteed.

For this reason, it is customary in electrophotographic printing devices (such as disclosed in German Patent 2,717,315) to construct the entire transfer station as a uniform component which can be swiveled on and away and to provide paper tractors with paper transport pegs recording medium transport device at the transfer station, which paper transport pegs engage in the lateral perforation of the continuous stationery. In this case, one pair of tractors is arranged both at the input side and at the output side of the transfer station.

Tractors of this type generally comprise a tractor belt with tractor flaps arranged above it which press the paper against the tractor belt. Whereas the paper tractors on the output side are generally easily accessible, operation of the input-side tractor flaps is difficult due to the design.

A further problem consists in the exact depositing of the continuous stationery provided with lateral perforations in the tractor belts, in which case it must be ensured that the continuous stationery is deposited accurately and without clearance on the tractor belts, specifically on the transport pegs. For this purpose, the continuous stationery must be guided tautly around the transfer station, which naturally poses difficulties.

SUMMARY OF THE INVENTION

An object of the invention is to provide a paper feed device for feeding continuous stationery, provided with lateral perforations, into the transport elements of a transfer station of a printing device with latent character image generation, which paper feed device allows a simple and accurate clamping and feeding of the continuous stationery. In this case, the feeding should take place as automatically as possible.

This and other objects is achieved by a paper feed device for feeding continuous stationery, provided with lateral perforations, into the transport elements of a transfer station of a printing device with latent character image generation, having the following features: the transfer station has in the transport direction of the continuous stationery paper transport elements which are motor-driven both on the input and on the output side and engage in the lateral perforation of the continuous stationery; a paper brake, which can be actuated when required, is arranged upstream of the input-side transport elements in the transport direction of the paper and a switch device is provided which, in order to clamp and feed the continuous stationery accurately in the transfer station after the continuous stationery has been deposited in the output-side paper transport elements, drives said paper transport elements during a feed time when the paper brake is activated.

Advantageous embodiments of the invention are provided by the transfer station being designed so that it can be swiveled onto and away from an intermediate support, and the transfer station being coupled with paper carrier elements which, in the swiveled-away position of the transfer station, form a widened paper guide channel for placing in or removing the continuous stationery. In particular, the transfer station is coupled with an actuation rocker which can be swiveled between an operating position and a depositing position. In a preferred embodiment, a scanning device is provided, which records the position of the actuation rocker and is coupled with the switch device, and the transfer station has a coupling device, via which the paper brake can be actuated.

Paper tractors with transport flaps are provided as paper transport elements, and the input-side paper tractors are coupled kinematically with the paper brake in such a way that the paper brake is opened when the transport flaps are closed. The paper brake has a deflection element, arranged in the paper channel, and a counter-element, which can be swiveled on and away, the web of paper being deflected, in the operating state of the paper brake, between said elements and thus braked. The counter-element, which can be swiveled on and away, is arranged on the actuation rocker.

Preferably, the actuation rocker has paper carrier elements which, together with other stationary paper carrier elements, form a paper channel for the continuous stationery. The actuation rocker has a gripping piece with an associated locking device for the operation position.

A width centering device may be provided for the continuous stationery in the input region to the transfer station, which width centering aligns the continuous stationery with its lateral perforation on the transport elements of the transfer station.

In the paper transport device according to the invention, a paper brake, which is to be actuated during the feed operation, is arranged upstream of the input-side transport elements in the paper transport direction. For feeding, the continuous stationery is first hooked into the output-side paper tractors which are easily accessible from above and then the continuous stationery is guided by the paper brake. For feeding, a switch device activates the output-side tractors when the paper brake is actuated. In order to prevent damage to the paper, the paper is moved at a creep speed in this process. Due to this input-side braking with simultaneous output-side drive, the continuous stationery is fed accurately in a simple manner into the transport pegs of the input-side tractor belts, it being ensured that the paper is automatically tautly around the transfer station. After a predeterminable feed time, the input-side transport flaps are closed automatically and the paper brake is released.

The entire paper feed operation is effected fully automatically and in a careful manner with respect to the paper.

In an advantageous embodiment of the invention, the transfer station is coupled with an actuation rocker which can be swiveled between an operating position and a depositing position, paper carrier elements, which are correspondingly coupled in a swiveled-away position, forming a widened paper guide channel for depositing or removing the continuous stationery at the transfer station.

Consequently the depositing of the paper is especially simple and ergonomically favorable.

After the continuous stationery has been deposited in the output-side paper tractors of the transfer station, the actuation rocker is swiveled into the operating position and the continuous stationery is thereby automatically brought into the paper brake. In this case, the paper brake is divided in an advantageous manner into two parts, a deflection element being arranged in a stationary manner in the paper channel and a corresponding counter-element being arranged on the actuation rocker.

BRIEF DESCRIPTION OF THE DRAWINGS

An embodiment of the invention is illustrated in the drawings and described in greater detail below by way of example.

DETAILED DESCRIPTION OF THE PREFERRED EMBODIMENTS

Figure 1:
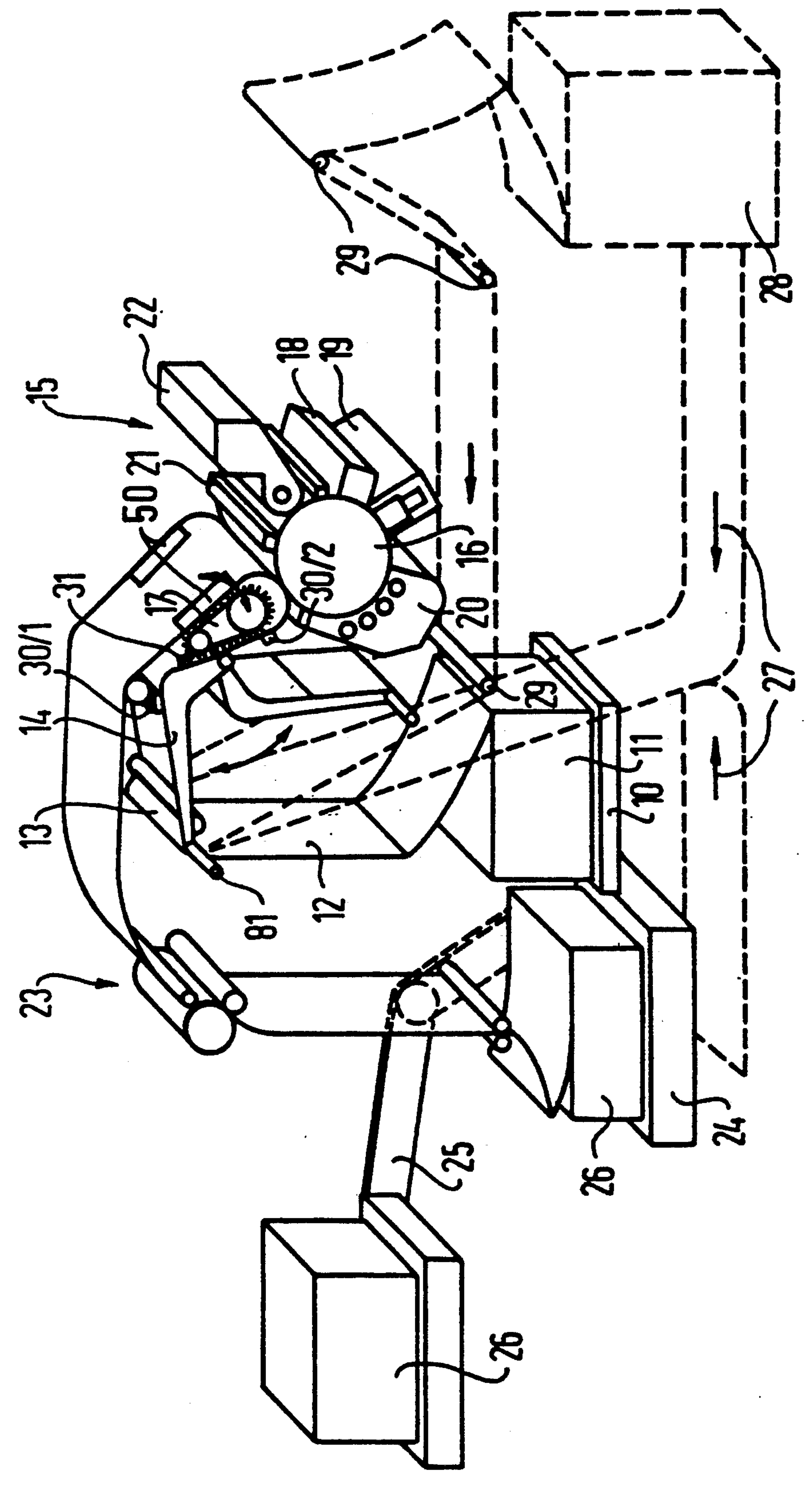
FIG. 1 shows a diagrammatic illustration of an electrophotographic printing device in perspective view.

A printing device operating according to the principle of electrophotography has a stock table 10 for accommodating a stock pile 11 made of prefolded continuous stationery, or paper, 12. The continuous stationery is fed to the actual electrophotographic printing assembly 15 via a paper separator 13 and an actuation rocker 14 which is provided with paper carrier elements and can be swiveled away. The printing assembly 15 has a transfer station 17, which can be swiveled onto and away from a photo carrier drum 16, and devices necessary for the electrophotographic process which are arranged around the photo carrier drum 16.

In order to produce a toner image on the continuous stationery, the photo carrier drum 16, which is charged with the aid of a charging device 18, is discharged in the customary way in a character-dependent manner via an LED character generator 19, and the charging image thus produced is colored in a developing station 20 with a developer mixture of particles of toner and medium. The toner image is then transferred onto the continuous stationery 12 in the transfer station 17. After transfer, the photo carrier drum 16 is discharged via a discharging station 21 and cleaned in a cleaning station 22 and recharged via the charging device 18.

Instead of the electrophotographic process described, to produce the toner image on the continuous stationery 12, it is also possible, for example, to use an electrostatic process or a magnetic process or even an ink pin which applies ink directly onto the continuous stationery.

The web of paper 12 provided with a toner image is then fixed chemically or by heat in a fixing station 23 and placed on a delivery table 24. In the exemplary embodiment of the printing device illustrated, the delivery table 24 is designed so that it can be swiveled out via a swivel lever 25 to facilitate removal of the printed stack of paper 26.

If the printing device is coupled, for example, with a further printing device in order, for example, to allow front and rear page printing, the web of paper 12 can also be fed directly to the paper separator 13 via external paper guide channels 27. Furthermore, it is also possible to use an external continuous stock pile 28 as stock pile. In this case, separate paper feed elements with paper cylinders 29 may be necessary to feed the web of paper.

In order to prevent particles, such as paper clips or other metal parts, which damage the photo carrier drum 16, from penetrating into the printing assembly 15, a particle trap 30/1, 30/2 is arranged either at the input region to the transfer station 17 or integrated in the transfer station. Furthermore, the printing device has a paper depositing apparatus, which can be activated via the actuation rocker 14, with an associated paper brake 31.

Figure 2:
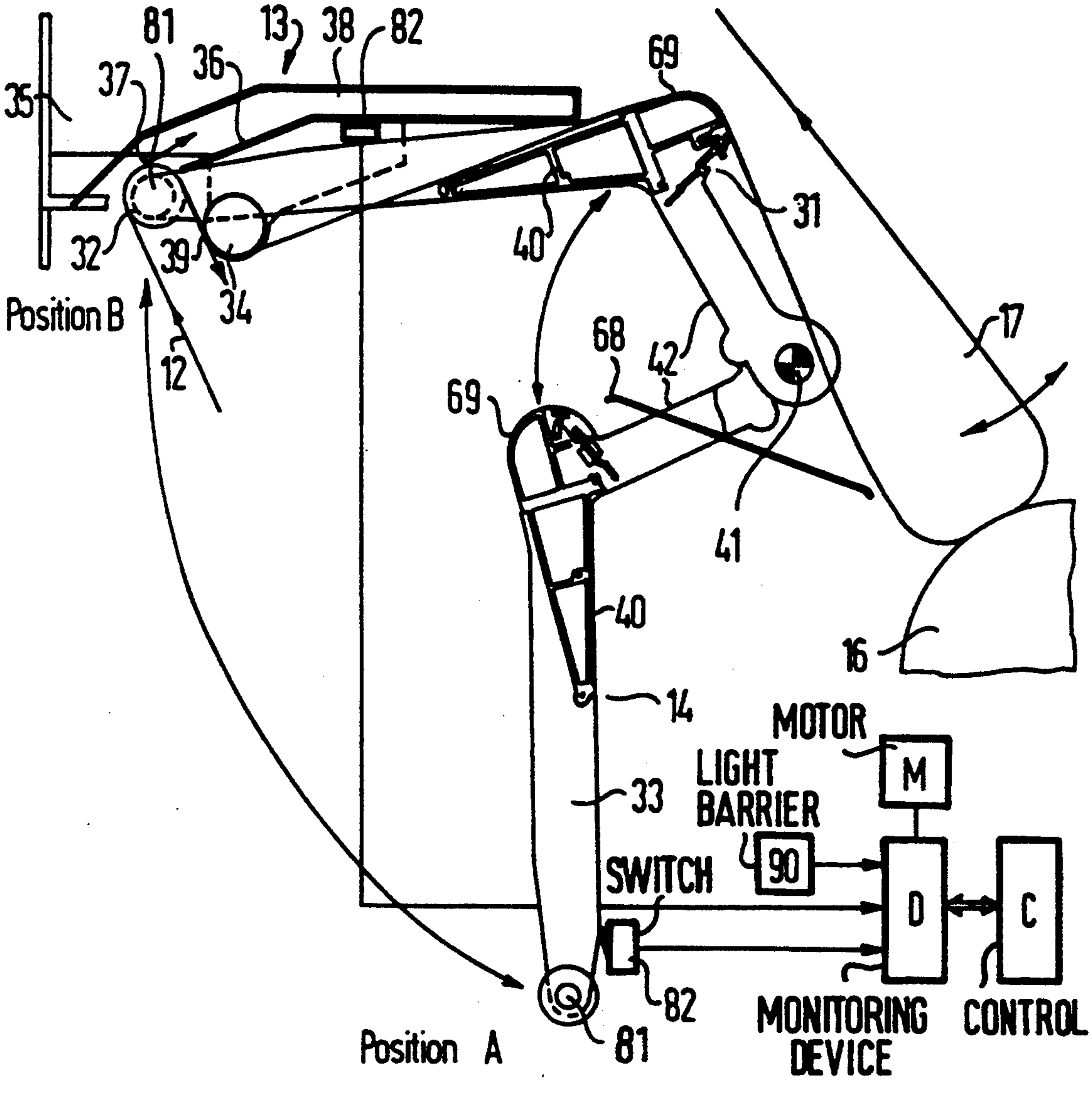
FIG. 2 shows a paper separator in the operating position (position B) and in the swiveled-away position (position A) in side view.

The apparatuses mentioned of the printing device are now described in detail:

Paper Separator (FIG. 2)

In order to separate adhering layers of paper of the continuous web of paper 12 that are drawn off the stack 11, a paper separator 13 is arranged at the entry of the feed channel to the printing assembly 15 above the stack of paper 11. The paper separator contains a first deflection element in the form of a rotatably mounted paper cylinder 32 which is arranged between two side parts 33 of the actuation rocker 14 at its free swivel end. Furthermore, it contains a second deflection element in the form of a motor-driven paper cylinder 34 which is arranged in a stationary manner on two support elements 35 which are fixedly connected to the housing of the printing device. In this case, the motor-driven paper cylinder 34 is situated in the swivel range of the actuation rocker 14. A paper carrier element 36 is arranged above the first deflection element (paper cylinder 32) in a spacing forming a passage for the web of paper. The paper carrier element 36 is constructed in such a way that, together with other plate elements, it forms a collection basket 38 for the first peeled-off folded sheet of the web of paper.

In the operating position (position B), i.e. with the actuation rocker 14 swiveled up, the continuous web of paper 12 is first guided in a first deflection direction via the first deflection element 32. A first layer of paper 37 adhering to the outside of the web of paper in relation to the paper cylinder 32 is peeled off with its folding edge by the paper carrier element 36 and enters into the collection basket 38. During further transport, the first layer of paper 37 is fanned out. A second layer of paper adhering to the inside in relation to the paper cylinder 32 is guided from the web of paper 12 around the paper cylinder 32 in the first deflection direction and, due to the deflection at the second deflection element (paper cylinder 34), it then becomes detached from the latter and drops downwards. This likewise leads to a fanning-out of the layer of paper so that a drawn-out unfolded continuous web of paper 12 is available for further transport via a paper carrier element 40 arranged between the side parts 33 of the actuation rocker 17.

Figure 3:
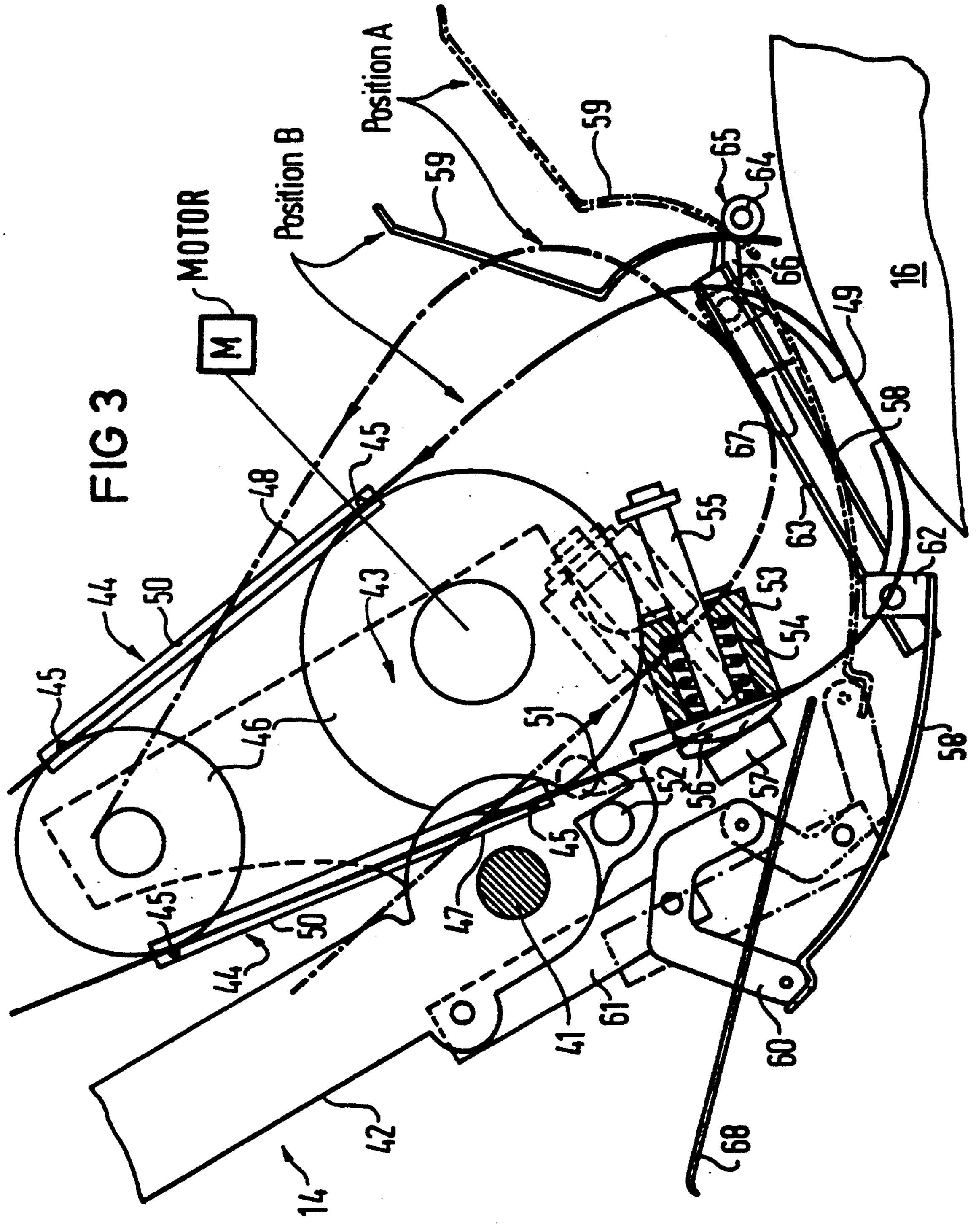
FIG. 3 shows a diagrammatic illustration of a part of the paper depositing apparatus in the region of the transfer station in side view.

Paper Depositing Apparatus (FIGS. 2, 3)

The actuation rocker 14 not only forms a constituent of a paper separator 13 but it is an essential functional element of a paper depositing apparatus for depositing the continuous stationery 12 in the printing device. In order to allow the continuous stationery to be deposited, the actuation rocker 14 is coupled mechanically with the transfer station 17 in such a way that, when the actuation rocker 14 is swiveled from a charging position A into an operating position B, the transfer station 17 is swiveled onto the photo carrier drum 16 and swiveled away when it is swiveled from position B into position A.

For this purpose, the actuation rocker 14 is mounted rotatably via holding elements 42 in the region of the transfer station on an axle 41 which is fixed to the frame. The transfer station itself is likewise mounted so as to be swivelable on the axle 41, which is fixed to the frame, via a cast support 43 which is illustrated only diagrammatically here. In this case, the transfer station contains a tractor drive with two tractor belts 44, engaging laterally in the lateral perforations of the continuous stationery 12, -with transport pegs 45 arranged thereon. The tractor belts 44 are guided and mounted on two pairs 46 of drive wheels which are connected to each other via axles, the tractors being driven via a motor M (FIG. 2) which is coupled with the large pair of drive wheels. When the continuous stationery 12 is transported, the continuous stationery is in engagement with the tractor belts, or transport elements, 44 via its perforation holes 9, seen in the transport direction of the paper both before 48 and after 48 the transfer region 49 of the transfer station at the input side paper tractor 47 and after the transfer region 49 at the output side paper tractor 48. Provided as securing and guide elements for the continuous stationery are four transport flaps 50 which press the continuous stationery against the tractor belts 44 in the region of the perforation holes 9.

The transfer station 17 is moved via a carrier 51 which is arranged in the bearing region of the actuation rocker 14 and interacts with a stop pin 52 on the cast support 43 (frame) of the transfer station 17. Attached to the cast support 43 is a sleeve 53 with a spring 54 contained therein and a spring bolt 55 guided in the sleeve 53. The spring bolt 55 lies with its head 56 on a stop 57 which is fixed to the frame and it rolls off on the latter during the movement of the transfer station. The swiveling on and away of the transfer station 49 consequently takes place with and counter to, respectively, the spring force of the spring 54. When the actuation rocker 14 is swiveled from position B into position A, the spring bolt 55 reinforces the swiveling-away movement of the transfer station, the stop pin 52 resting on the carrier 51 up to a certain swivel angle. In this case, the swivel angle of the transfer station is limited by the length of the spring bolt 55 with a stop arranged thereon.

In order not to smear the toner image on the web of paper when the transfer station with the deposited web of paper is swiveled away, the transfer station 17 is mounted in relation to its pivot point in such a way that the paper guided via the transfer station 17 in the transfer region 49 is immediately lifted from the photo carrier drum without dragging there.

In order to protect the photo carrier drum 16 in the swiveled-away state of the transfer station and, in particular for introducing the continuous stationery 12, to be able to form a widened paper channel, swivelable paper carrier elements 58 and 59 are arranged in the region of the transfer station. The paper carrier element 58 is attached via a toggle lever 60 to a guide piece 61 mounted on the actuation rocker 14, one end of the paper carrier element 58 being guided via a slide pin 62 in a rail 63 which is fixed to the frame.

In turn, the paper carrier element 59 which is arranged after the transfer region 49 is mounted so as to be fixed to the frame and swivelable via a bearing 64. In the region of the bearing 64, it has a spring 65 which presses the paper carrier element 59 into the illustrated closed position B. Furthermore, the paper carrier element 59 is connected to an attachment piece 66 which interacts with the slide pin 62. In this case, the slide pin 62 is situated in the swivel range of the attachment piece 66 and it presses the paper carrier plate 59 outwards in the position A. In an embodiment which is not illustrated here, the paper carrier element 59 is supported on a knob of the transfer station 17 under the effect of the spring 65 and it is swiveled away via this knob.

In the operating position (position B) with the actuation rocker 14 swiveled up, the transfer station 17 is swiveled onto the photo carrier 16 and the paper carrier elements 58 and 59 release the transfer region 49. If the actuation rocker 14 is swiveled in position A, the paper carrier plate 58 is guided on the rail 63 into the region between the photo carrier drum 16 and the transfer station 49 and a widened paper guide channel 67 opens between the transfer station 17 and the paper carrier element 58. In this case, the paper carrier element 58 protects the photo carrier drum 16 from the entry of light and damage in the transfer region 49. The paper guide channel 67 is continued in the paper transport direction by the swiveled-away paper carrier element 59, the paper carrier elements 58, 59 partially overlapping one another.

Before the paper carrier elements 58, 59 in the paper transport direction, a paper guide plate 68 is arranged fixedly which interacts with a round paper guide region 69 of the actuation rocker 14. The paper guide region 69 serves as a paper deflection element for the web of paper.

In position A of the actuation rocker 14, the continuous stationery 12 can now be guided without problems through the paper guide channel 67 via the paper guide region 69, the paper guide plate 68 and the paper carrier elements 58 and 59 around the transfer station and deposited in the output-side tractor belt 48.

Figure 4:
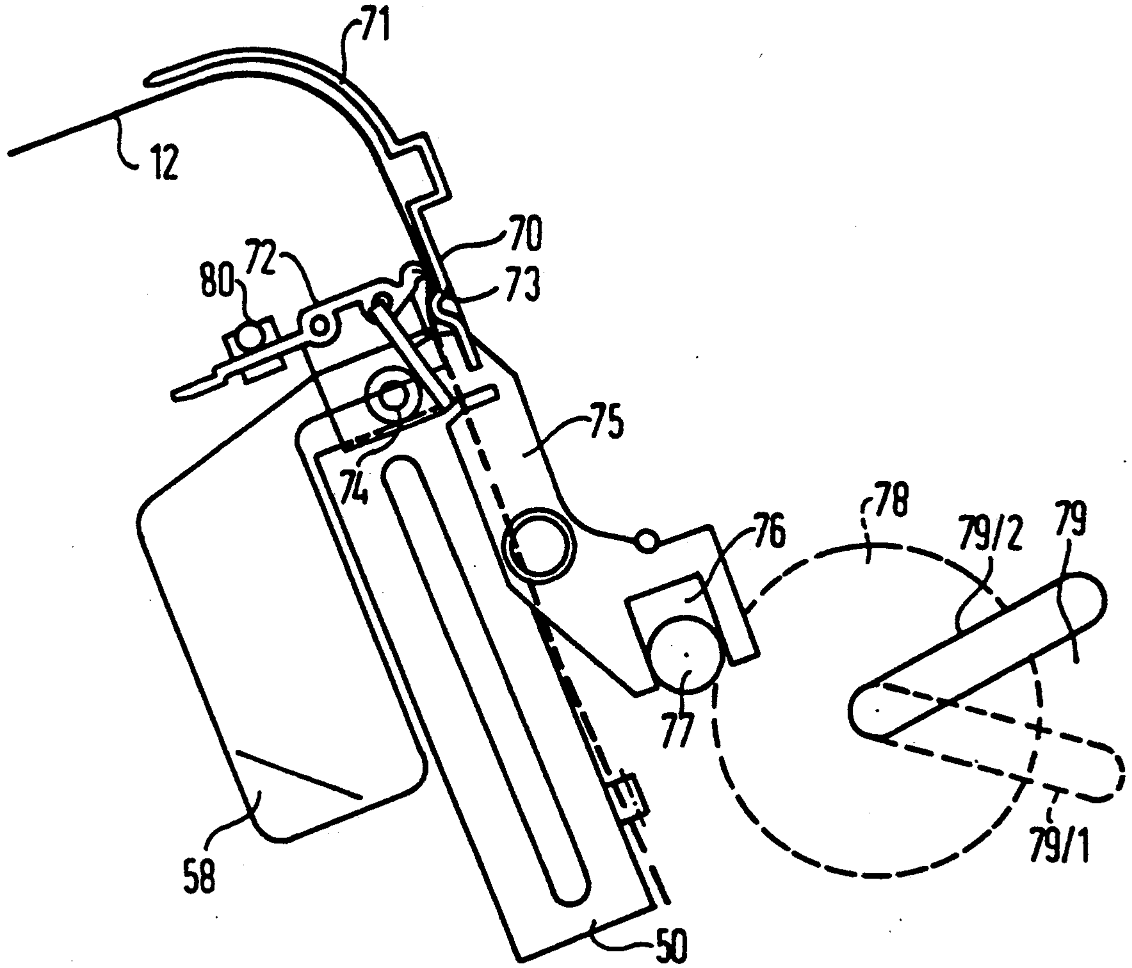
FIG. 4 shows a diagrammatic illustration of a paper brake in the activated state with the tractor flaps opened.
Figure 5:
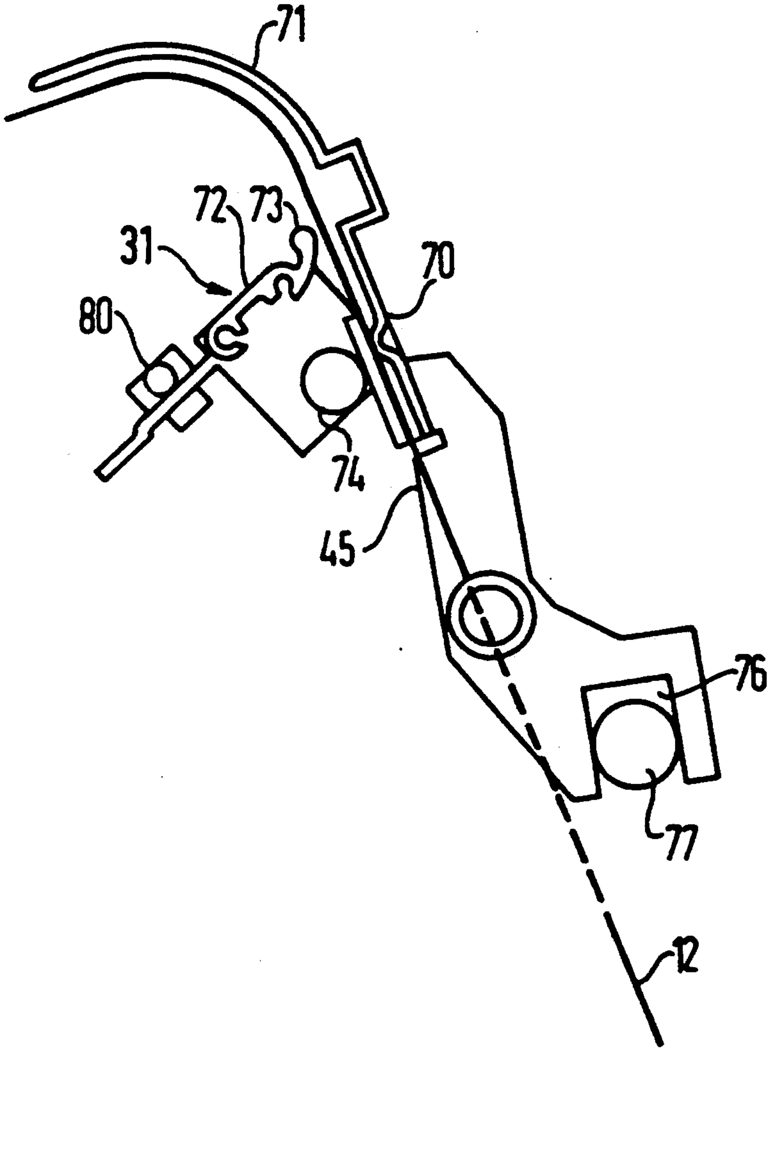
FIG. 5 shows a diagrammatic illustration of the paper brake in the deactivated state with the tractor flaps closed.

Paper Brake (FIGS. 4, 5)

A paper brake 31 (FIG. 1) is arranged in the inlet region of the paper guide channel for the transfer station 17. The paper brake contains a deflection element 70 in the form of a plate rib which is attached to the transfer station at the input of the transfer station 17 and is a constituent of a continuous deflection plate 71. The deflection element 70 interacts with a counter-element 72 which can be swiveled on and away and is arranged on the actuation rocker 14 in the paper guide region 69. The counter-element 72 has a brake projection 73 and a stop pin 74 which interacts with an actuation lever 75 mounted on the transfer station 17. The actuation lever 75, in turn, is coupled via a recess 76 with a pin 77 which interacts via a gear 78 with a switch lever 79 for closing the tractor flaps 50 of the feed region of the transfer station. Furthermore, the switch lever 79 is coupled with the tractor flaps 50 via the gear 78 and corresponding catch projections (not illustrated here). In the operating state, the tractor flaps 50 rest on the web of paper under the effect of pressure springs (not illustrated here) which are arranged in the hinge region of the tractor flaps. If they are swiveled away, this takes place counter to the effect of these pressure springs, the tractor flaps 50 remaining in the opened state after the dead center point of the springs has been overcome.

When the tractor flap 50 is opened, the switch lever 79 is in the position 79/1. Via the pin 77, the actuation lever 75 is in the swiveled-out position and it presses the counter-element 72 with the brake projection 73 into the operating position. In this case, the actuation rocker 14 is in the position B, i.e. in the swiveled-up position. Thus the paper brake is activated and the continuous stationery 12 is deflected between the brake projection 73 and the plate rib and thereby braked. The brake projection 73 is a constituent of the counterelement 72 which consists of a profile piece extending over the width of the continuous stationery 12.

For closing the two tractor flaps 50 arranged in the input region of the transfer station, the switch lever 79 is brought into the position 79/2, by which means the flaps 50 swivel via the gear 78 over the dead center point of their springs and the springs close the flaps. At the same time, the actuation lever 75 is swiveled back via the pin 77 and, under the effect of a spring 80 arranged at the pivot point of the counterelement 72, the counter-element 72 swivels back with the brake projection 73 and comes out of engagement with the continuous stationery 12 and releases it. The continuous stationery 12 can now be guided freely through the paper brake 31 in the printing operation without braking effect.

Figure 10:
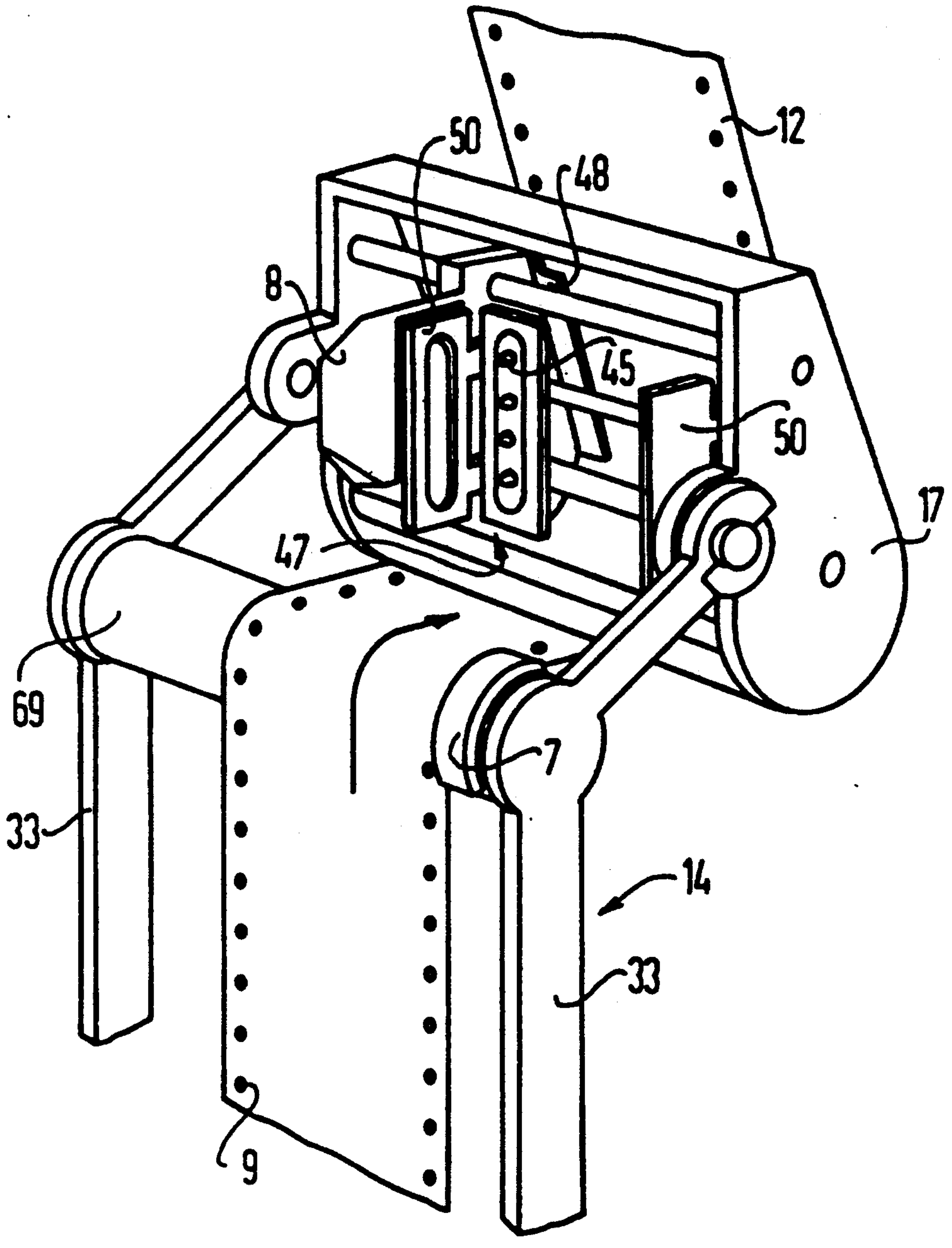

The entire paper depositing apparatus functions as follows:

After the stack of paper 11 has been deposited on the stock table 12, the actuation rocker 14 is swiveled via a handle 81 (shown in FIG. 1) into the position A. The position A is scanned via a switch 82 (FIG. 2). The transfer station 17 is swiveled away and the paper carrier elements 58 and 59 cover the photo carrier drum 16 and open a wide paper depositing channel 67. The paper can be guided through the printing station via the paper depositing channel and hooked into the output-side tractors 48. Then the transport flaps 50 of the output-side tractors 48 are closed. If the transport flaps 50 of the tractors 47 arranged in the paper inlet region of the transfer station 17 happen to be closed, they are opened. By this means, the switch lever of the flap actuation 79 is in the position 79/2. The actuation lever 75 of the paper brake is swiveled out. This position is illustrated in FIG. 10.

In order to be able to feed the continuous stationery 12 in the correct position into the transport pegs 45 of the input tractors 47 before the transfer station 17, it must be centered in width before the charging rocker 14 is closed. This means that the web of paper 12 must be aligned on the actuation rocker 14 in such a way that the perforation holes 9 of the continuous stationery 12 are flush with the output-side tractors 48. This can by no means be taken for granted since, depending on the position of the stack 11, the web of paper 12 may lie too far to the front or too far to the rear on the stock table. In order to achieve this centering, a centering device is arranged in the input region of the transfer station. It contains a bent plate tab 8 (shown in FIG. 10) which is coupled with the input-side tractors 47 so as to be displaceable in width. The plate tab serves as a centering guide for the continuous stationery, seen in the transport direction of the continuous stationery 12, and, together with the tractors 47, can be adapted to the width of the continuous stationery 12. Furthermore, a fixed right hand guide stop 7 for the continuous stationery 12 is arranged on the deflection region 69 of the attachment rocker 14.

If the actuation rocker 14 is closed, in a slow operation at a creep speed of the continuous stationery 12, a rough centering first takes place via the right hand front stop 7. In the course of the upward swiveling of the charging rocker 14, the web of paper passes into the catch region of the rear centering, namely the catch region of the plate tab 8. With the aid of the slowly running paper drive, the continuous web of paper 12 is centered between the front fixed stop 7 and the rear stop 8, with the result that the perforation holes 9 are aligned with the input tractors belts 47.

Then the actual feeding of the perforation holes onto the transport pegs 45 takes place.

As described, the tractors were already activated at a creep speed when the actuation rocker 14 was swiveled away in the direction of the operating position B via a timing unit which may be arranged, for example, in the printer control C, and monitoring device D shown in FIG. 2. The timing unit may be constructed, for example, as a counter.

When it is swiveled up, the paper carrier element 58 is first swiveled out of the transfer region 49 via the toggle lever 60 and the guide piece 61. If the actuation rocker 14 is then moved further in the direction of position B, as described, the centering device begins to function and the carrier 51 comes into contact with the stop pin 52 and thereby moves the transfer station 17 completely in its operating position (position B FIG. 3). Shortly before a lock mounted on the actuation rocker 14 is closed in the position B, the paper brake becomes active.

The output-side tractors 48 now pull the continuous stationery counter to the effect of the paper brake 31 until it is clamped tautly around the transfer station 17. By this means, the transport pegs 45 of the tractors 47 arranged on the input side come into engagement with the perforation holes 9 of the continuous stationery 12.

If the actuation rocker 14 is closed, this position is scanned via a further switch 82 and relayed to the monitoring device D. The web of paper has now been guided through the paper separator 13.

When the creep speed phase has been completed, the transport flaps 50 are closed via the switch lever 79. The paper brake 81 is deactivated in the manner described and the continuous stationery 12 is released. Thus the paper is completely deposited in the transfer region and it can now be fed through automatically by further transport to the fixing station 73 or to the delivery table 24.

Instead of the semi-automatic feed, it is also possible to achieve a fully automatic feed in that the actuation of the switch lever 79 takes place via a rotary magnet. The rotary magnet can be arranged in the region of the gear 78 and it is connected to the control of the printing unit and to the switches 82.

In this case, the rotary magnet can be switched in such a way that it automatically closes the transport flaps 50 after the end of the creep phase when the web of paper 12 is fed in.

The opening of the depositing apparatus when the web of paper has been deposited takes place in reverse sequence. First the switch lever 79 is brought into the position "flap open" 79/2 and thereby activates the paper brake 31. Then the transport flaps 50 arranged in the input region of the transfer station 17 are opened and the actuation rocker 14 is swiveled away via the handle 31 after release of the lock. Thus the paper guide channel 67 opens, the transfer station is swiveled away and the transport flaps 50 arranged in the outlet region of the transfer station can be opened.

Due to the arrangement of a rotary magnet, this sequence can also be automated, a printer stop being used to release the lock of the transport flaps 50 and set the paper brake 31 in function. Then the transport flaps 50 arranged in the input region 47 of the transfer station 17 are opened, the actuation rocker 14 is swiveled away and the transport flaps 50 arranged in the output region 48 of the transfer station are opened.

Instead of the two-part mechanical paper brake, it is also possible to arrange a paper brake operating with negative pressure, in which the continuous stationery is drawn by suction against a suction plate and thus braked.

In the two-part paper brake with a deflection element 71, consisting of a plate rib, and a counter-element 72, arranged on the actuation rocker 14, the brake effect is automatically adapted by the thickness of the continuous stationery 12 used. Thus with thin paper, the brake force must not be too large in order, for example, not to tear or stretch the paper. Due to the smaller thickness of the paper, the paper in the paper brake is deflected less and thereby undergoes a smaller braking force. Thicker paper is deflected more and accordingly braked more strongly.

In paper brakes actuated at negative pressure, a separate adaptation of the negative pressure to the thicknesses or the weight of the paper is required for this purpose.

The brake force of a paper brake provided with deflection elements, whether it be of single-part or two-part design, depends greatly on the deflection radius on the deflection element 70 and on the counter-element 72 and can be adjusted via the radii. In this case, the basic dimensioning of the paper brake depends inter alia on the type of recording medium used and the type of transport means and the drive in the transfer station.

Figure 6:
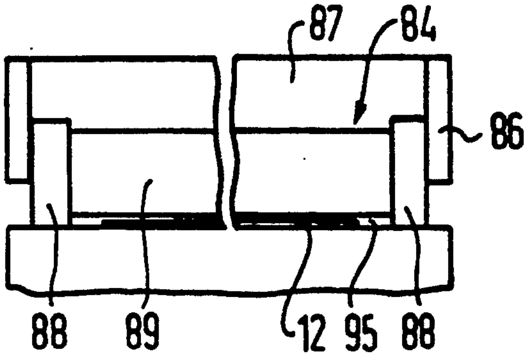
FIG. 6 shows a diagrammatic front elevation of a particle trap.
Figure 7:
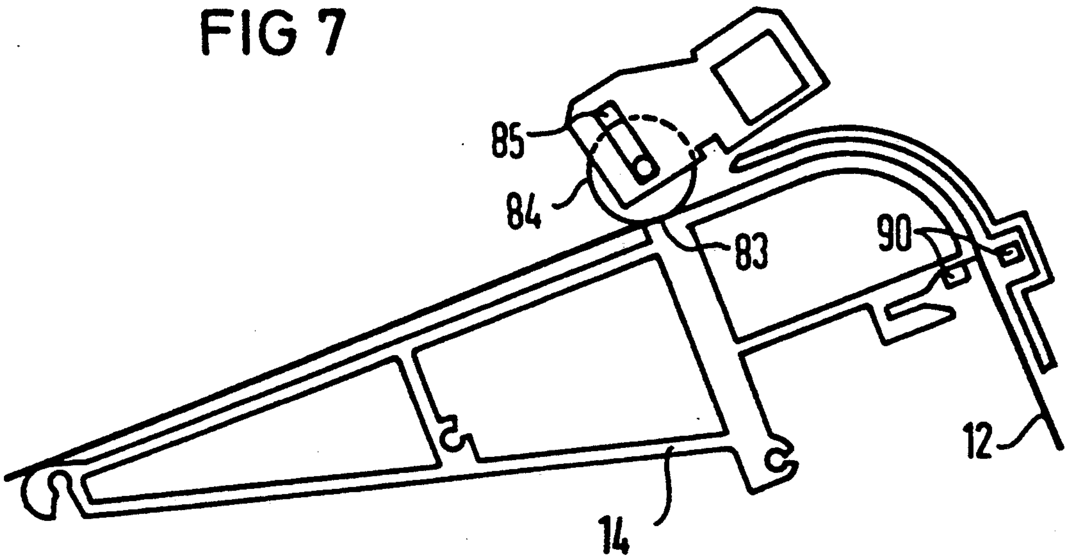
FIG. 7 shows a diagrammatic lateral illustration of a particle trap in the input region of the paper guide channel.

Particle Trap (FIGS. 6, 7)

As described at the beginning, there is a particle trap in the input region of the transfer station 17 which serves for preventing the entry of metal elements, such as paper clips or the like, into the region of the transfer station. Metal elements of this type would lead to the photo carrier being damaged. For this purpose, a round metal rod 84 is guided in slots 85 of a holder via a paper saddle of the actuation rocker 14 Just before the deflection region 69. In this case, the holder consists of a transverse rod 87 which is attached to the housing of the printing device with lateral holding tabs 86. In turn, the metal rod 84 has two lateral round guide regions 88 with a large diameter and a catch region 89 with a smaller diameter extending transversely over the web of paper. Thus a passing slot for the paper 12 results in the catch region 89 between the paper saddle 83 and the transverse rod 87.

A metal object which has entered into the paper slot becomes wedged in the passing slot 95 and leads to the web of paper becoming torn. This tearing of the web of paper 12 is recognized via corresponding detectors, for example in the form of a light barrier 90 arranged in the deflection region 69 and the paper transport is stopped. In order to remove the particle, the transverse rod 87 can be moved upwards in the slots 85 of the lateral holder 86. The holder 86 with the slots 85 is arranged via the transverse rod 87 at such an angle to the web of paper that the wedge effect is reinforced when metal particles enter. This means that it reliably leads to a wedging of the metal piece to be trapped with subsequent tearing of the paper, but, on the other hand, it is ensured that the metal piece can be removed again in an easy manner by lifting the metal rod 84.

Figure 8:
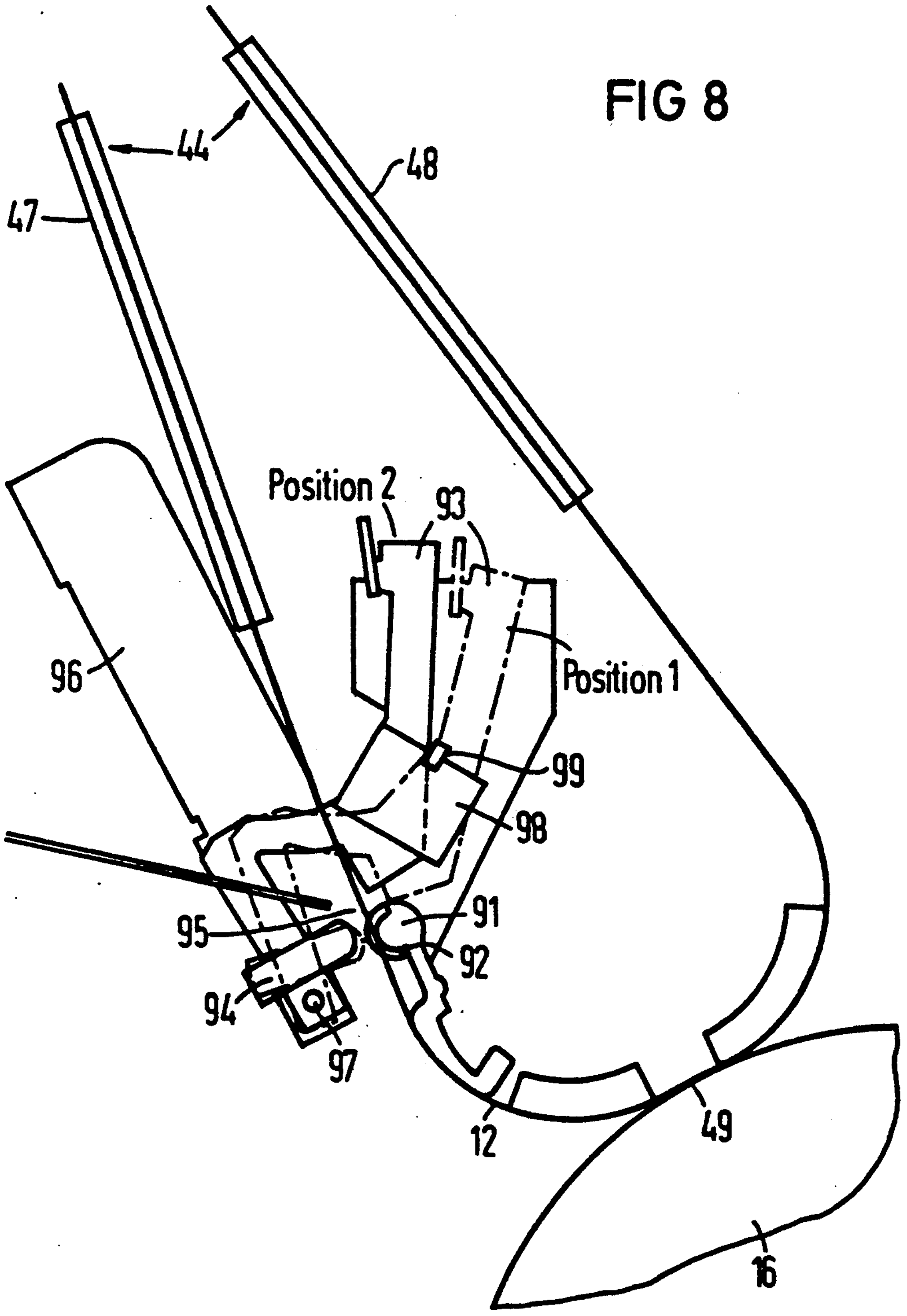
FIG. 8 shows a diagrammatic sectional illustration of the transfer station with an integrated particle trap.
Figure 9:
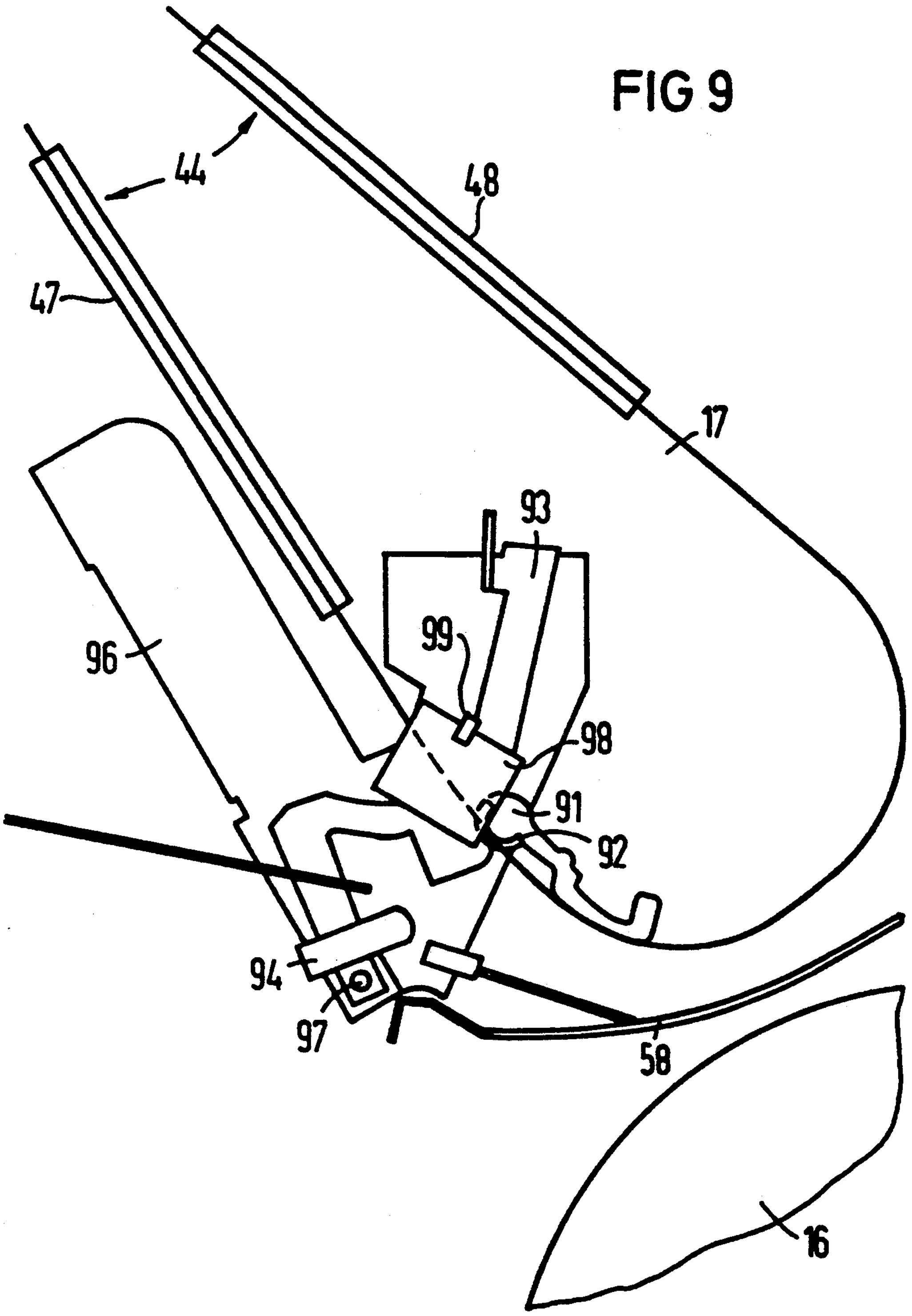
FIG. 9 shows a diagrammatic sectional illustration of the transfer station with an opened particle trap and FIG. 10 shows a diagrammatic illustration of a paper centering device in the input region of the transfer station in perspective view.

In a preferred exemplary embodiment of the particle trap according to FIGS. 8 and 9, the particle trap is arranged on the transfer station 17 between the input- and output-side paper tractors 47, 48 before the transfer point 49 in the paper transport direction. Thus during movement of the paper either in the forward or in the reverse direction, the paper cannot become jammed in the passing slot of the particle trap since the paper is always clamped between the tractors 47 and 48.

The particle trap itself contains a deflection profile 91 arranged in the paper channel of the transfer station, which deflection profile extends over the width of the transfer station 17 and on which the continuous stationery slides with its untoned reverse side. Spacer plates 92 are attached to the lateral ends of the deflection profile 91. Thus a structure for the deflection profile 91 results which corresponds to the metal rod 84 including the guide regions 88 of the exemplary embodiment of FIG. 2.

A particle bar 94 in FIG. 8 in the form of a metal rod can be swiveled onto the deflection profile via a lever 93, the particle bar 94 resting on the spacer plates 92 in the swiveled-on state and forming a passing slot 95 (calibration gap) to catch the particles between the deflection profile 91 with the continuous stationery 12 guided on it.

In cross-section, the calibration gap 95 is funnel-shaped in the inlet region of the paper. It is thus ensured that the metal pieces to be trapped become wedged with the following paper.

The lever 93 is mounted on a bearing block 96 for the swivel bearing 41 of the actuation rocker 14, specifically so as to be swivelable about a pivot point 97. Furthermore, it has a catch apparatus 98 which allows it to catch the lever 93 in two positions. These catch positions are scanned via a microswitch 99. The catch positions are: a first position (position 1), in which the particle bar 94 is swiveled onto the deflection profile 91 and thus the particle trap is closed, and a second position (position 2), in which the particle bar 94 is swiveled away from the deflection profile 91. The swiveled-away position 2 is necessary if labels arranged on the continuous stationery 12 are to be printed using the printing device, which labels thicken the paper considerably. If the particle trap were not swiveled away, the labels would become wedged in the paper slot. The positions of the lever 93 are recognized via a microswitch 99 and relayed to the equipment control of the printing device. The equipment control monitors the functional states of the particle trap.

In both lever positions 1 and 2 of FIG. 4, the transfer station 17 is in the operating position, i.e. it is swiveled onto the photo carrier drum 16 and the actuation rocker 14 is engaged.

If a metal piece becomes wedged in the calibration gap 95 (passing slot) in this operating position, the web of paper 12 tears and this tear is recognized by the light barrier 90 and the paper transport is stopped. In order to remove the particles, according to FIG. 9 the transfer station 17 is swiveled away via the actuation rocker 14, the paper carrier element 58 is thereby swiveled into the paper transport channel and it protects the photo carrier drum 16. Any particles dropping out of the calibration gap cannot damage the photo carrier drum 16.

The entire control of the feed operation and the monitoring of the individual elements of the paper depositing apparatus take place via a customary microprocessor-controlled monitoring device D (FIG. 2). The monitoring device D records the switching states of the switches 82, a light barrier 90 and controls the drive motors M of the transfer station 17. The monitoring device D is a constituent of the equipment control C which may be designed, for example, in accordance with U.S. Pat. No. 4,593,407.

Although other modifications and changes may be suggested by those skilled in the art, it is the intention of the inventor to embody within the patent warranted hereon all changes and modifications as reasonably and properly come within the scope of his contribution to the art.

I claim:

1. A paper feed device for feeding continuous stationery, provided with lateral perforations, into transport elements of a transfer station of a printing device with latent character image generation, comprising:

a motor;

input side paper transport elements and output side paper transport elements in the transfer station operable to carry the continuous stationary in a transport direction of the continuous stationery, said input side paper transport elements and said output side paper transport elements being connected for drive by said motor both on an input and on an output side and engaging in the lateral perforation of the continuous stationery;

a paper brake, which can be actuated when required, is arranged upstream, of the input-side transport elements in the transport direction of the continuous stationary to clamp the continuous stationary;

an actuation rocker movable between first and second positions, said actuation rocker carrying said paper brake and carrying said continuous stationary when said paper brake is clamped so that said continuous stationary is moved between a paper loading position and an operating position; and a control means for controlling clamping and for operating said motor to feed the continuous stationery in the transfer station after the continuous stationery has been deposited in the output-side paper transport elements, said motor drives said paper transport elements during a paper feed time when the paper brake is activated.

2. A paper feed device as claimed in claim 1, wherein the printing device has an image transfer device, the transfer station is mounted to swivel onto and away from said image transfer device, and wherein the transfer station is coupled with paper carrier elements which, in the swiveled-away position of the transfer station, form a widened paper guide channel for placing in or removing the continuous stationery.

3. A paper feed device as claimed in claim 1, wherein a sensor is provided, which records the position of the actuation rocker and is coupled with said control means, and wherein the transfer station has a coupling device, via which the paper brake can be actuated.

4. A paper feed device as claimed in claim 1, further comprising:

transport flaps provided on said paper transport elements, and means for kinematically coupling the input-side paper tractors with the paper brake in such a way that the paper brake is opened when the transport flaps are closed.

5. A paper feed device as claimed in claim 1, wherein the paper brake has a deflection element, arranged in a paper channel, and a counter-element, which can be swiveled on and away, the continuous stationary being deflected, in an operating state of the paper brake, between said deflection element and said counter element and thus braked.

6. A paper feed device as claimed in claim 1, wherein the counter-element, which can be swiveled on and away, is arranged on the actuation rocker.

7. A paper feed device as claimed in claim 1, wherein the actuation rocker has paper carrier elements which, together with other stationary paper carrier elements, form a paper channel for the continuous stationery.

8. A paper feed device as claimed in claim 1, wherein the actuation rocker has a handle with an associated locking device for the operating position.

9. A paper feed device as claimed in claim 1, further comprising:

a width centering device for the continuous stationery in an input region of the transfer station, said width centering device aligns the continuous stationery with its lateral perforation on the transport elements of the transfer station.

* * * * *